US012572932B2

(12) United States Patent (10) Patent No.: US 12,572,932 B2
Bechar et al. (45) Date of Patent: Mar. 10, 2026

(54) SYSTEMS AND METHODS FOR BLOCKCHAIN NETWORK TRAFFIC MANAGEMENT USING AUTOMATIC COIN SELECTION

(71) Applicant: CITIBANK, N.A., New York, NY (US)

(72) Inventors: Boaz Bechar, St. Tel Aviv (IL); David Bloch, Tel-Aviv, IL (US)

(73) Assignee: CITIBANK, N.A., New York, NY (US)

( * ) Notice: Subject to any disclaimer, the term of this patent is extended or adjusted under 35 U.S.C. 154(b) by 143 days.

(21) Appl. No.: 18/650,591

(22) Filed: Apr. 30, 2024

(65) Prior Publication Data

US 2025/0173714 A1 May 29, 2025

Related U.S. Application Data

(63) Continuation of application No. 18/521,415, filed on Nov. 28, 2023, now Pat. No. 11,978,049.

(51) Int. Cl.
*G06Q 20/38* (2012.01)
*G06N 20/00* (2019.01)

(52) U.S. Cl.
CPC .......... *G06Q 20/389* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,393,423 | B1 | 5/2002 | Goedken |
| 10,795,640 | B1 | 10/2020 | Knight et al. |
| 10,853,563 | B1 | 12/2020 | Chen et al. |
| 11,171,989 | B1 | 11/2021 | Kim |
| 2008/0098291 | A1 | 4/2008 | Bradley et al. |
| 2011/0213642 | A1 | 9/2011 | Makar et al. |
| 2012/0095835 | A1 | 4/2012 | Makar et al. |
| 2012/0288845 | A1 | 11/2012 | Kumar Gl |

(Continued)

OTHER PUBLICATIONS

International Search Report and Written Opinion on International Application No. PCT/US2024/051885 dated Nov. 8, 2024 (7 Pages).

(Continued)

*Primary Examiner* — Patrick McAtee
*Assistant Examiner* — Jason B Fenstermacher
(74) *Attorney, Agent, or Firm* — Foley & Lardner LLP

(57) ABSTRACT

A computer can monitor network traffic on a blockchain computing network. The computer can determine a current level of network congestion on the blockchain computing network. The computer can execute a first machine learning model that predicts a timeseries of future transaction costs based on historical data and the current level network congestion level of the blockchain computing network. The computer can also execute a second machine learning model to predict a timeseries of future transaction sizes and UTXO types for the distributed ledger-based account based on historical transaction data. The computer can select one or more UTXOs to use to complete the transaction of the transaction request. The computer can append a block instance containing an identification of the selected one or more UTXOs to the blockchain to complete the transaction.

20 Claims, 4 Drawing Sheets

(56)     References Cited

U.S. PATENT DOCUMENTS

| | | | |
|---|---|---|---|
| 2017/0192950 A1 | 7/2017 | Gaither et al. | |
| 2017/0230312 A1 | 8/2017 | Barrett et al. | |
| 2018/0075014 A1 | 3/2018 | Duan | |
| 2018/0143973 A1 | 5/2018 | Hambrick et al. | |
| 2018/0234367 A1 | 8/2018 | Lange et al. | |
| 2018/0331979 A1 | 11/2018 | Rakovitsky et al. | |
| 2019/0087707 A1 | 3/2019 | Cummins et al. | |
| 2019/0138600 A1 | 5/2019 | Krishnan et al. | |
| 2019/0172026 A1* | 6/2019 | Vessenes | G06Q 20/065 |
| 2019/0340586 A1* | 11/2019 | Sheng | G06Q 20/367 |
| 2020/0044998 A1 | 2/2020 | Jeon et al. | |
| 2020/0134532 A1 | 4/2020 | Yamane et al. | |
| 2020/0218766 A1 | 7/2020 | Yaseen et al. | |
| 2020/0341604 A1 | 10/2020 | Hewitt | |
| 2020/0342032 A1 | 10/2020 | Subramaniam et al. | |
| 2020/0380202 A1 | 12/2020 | Cass et al. | |
| 2021/0019740 A1 | 1/2021 | Bhamidipati et al. | |
| 2021/0279232 A1 | 9/2021 | Kim | |
| 2023/0046813 A1* | 2/2023 | Benkreira | H04L 63/08 |
| 2023/0186290 A1* | 6/2023 | Navon | G06Q 20/02 |
| | | | 705/64 |
| 2024/0202703 A1* | 6/2024 | Brogliato | G06Q 20/36 |

OTHER PUBLICATIONS

"Turn your sales into conversations", Space10, archived on Mar. 25, 2020 at URL: https://web.archive.org/https://space10-community. github.io/conversational-form/landingpage/ (6 pages).
Tang, Shekman, "The cult of conversational design: why forms aren't dead yet", Inside Intercom, Oct. 11, 2017, retrieved from URL: https://www.intercom.com/blog/why-forms-arent-dead-yet/ (12 pages).

\* cited by examiner

300

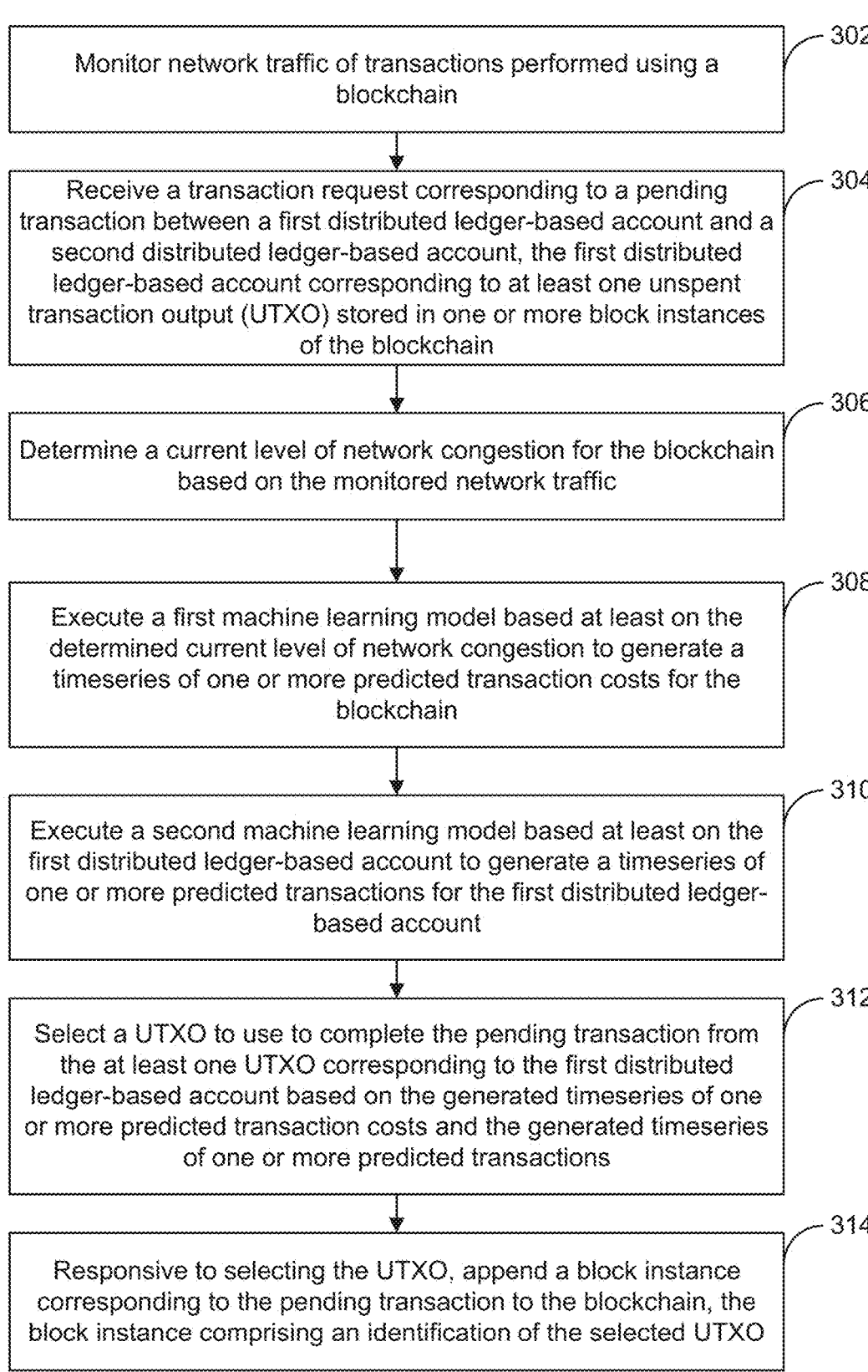

302

Monitor network traffic of transactions performed using a blockchain

304

Receive a transaction request corresponding to a pending transaction between a first distributed ledger-based account and a second distributed ledger-based account, the first distributed ledger-based account corresponding to at least one unspent transaction output (UTXO) stored in one or more block instances of the blockchain

306

Determine a current level of network congestion for the blockchain based on the monitored network traffic

308

Execute a first machine learning model based at least on the determined current level of network congestion to generate a timeseries of one or more predicted transaction costs for the blockchain

310

Execute a second machine learning model based at least on the first distributed ledger-based account to generate a timeseries of one or more predicted transactions for the first distributed ledger-based account

312

Select a UTXO to use to complete the pending transaction from the at least one UTXO corresponding to the first distributed ledger-based account based on the generated timeseries of one or more predicted transaction costs and the generated timeseries of one or more predicted transactions

314

Responsive to selecting the UTXO, append a block instance corresponding to the pending transaction to the blockchain, the block instance comprising an identification of the selected UTXO

FIG. 3

SYSTEMS AND METHODS FOR BLOCKCHAIN NETWORK TRAFFIC MANAGEMENT USING AUTOMATIC COIN SELECTION

CROSS-REFERENCE TO RELATED APPLICATION

This application claims the benefit of priority as a continuation to U.S. patent application Ser. No. 18/521,415, filed Nov. 28, 2023, the entirety of which is incorporated by reference herein.

TECHNICAL FIELD

This application generally relates to managing network traffic of a blockchain infrastructure. In particular, the present application relates to determining cryptocurrency to use to perform transactions using a machine learning architecture to optimize network traffic on a blockchain.

BACKGROUND

One of the critical challenges of blockchain technology pertains to Unspent Transaction Outputs (UTXOs) (unused currency in a blockchain-based transaction). UTXOs are generated and stored on a blockchain maintained by a blockchain computing network as a result of previous transactions and are associated with the recipient of the transaction's public key of the recipient's distributed ledger-based account. UTXOs associated with a user's distributed ledger-based account may be used in future transactions by the user. For example, a user with a distributed ledger-based account on a blockchain may attempt to complete a transaction to obtain a product or service. The user's distributed ledger-based account may be associated with different UTXOs. A computer may receive a transaction request for a transaction associated with the user's distributed ledger-based account. There may be different permutations of UTXOs associated with the distributed ledger-based account that the computer can select to use to complete the transaction. The computer may indiscriminately choose (e.g., based on a user's selection) a combination of UTXOs that satisfies the requirements to complete the transaction without any regard to the implications of the selection on the blockchain computing network or future transactions.

SUMMARY

Systems and methods that are used to complete transactions using a blockchain computing network may perform such transactions using a rule-based system to select UTXOs to complete the transactions. Some conventional methods for UTXO selection do not consider external factors beyond the available set of UTXOs to use in a transaction. Such methods often suffer from inefficiencies that can result in sub-optimal transaction fees and loss of assets due to creation of UTXOs that are below the minimum spendable threshold (e.g., dust outputs) and can result in excessive network costs (e.g., processing costs) when a method selects a large number of UTXOs to perform a transaction during a time period in which there is a significant amount of network traffic on the blockchain computing network. These inefficiencies can arise due to existing UTXO selection strategies that evaluate the selection on a 'per-transaction' basis and do not consider additional factors, such as the distributed ledger-based account's future transaction requirements or network congestion on the blockchain computing network.

To overcome these challenges, a computer can use additional factors outside of the available UTXOs for UTXO selection. For example, a computer can use machine learning to create a model of each wallet's spending pattern to predict future transaction amounts and generate predicted network cost estimates to determine whether it is an optimal time to consolidate small UTXOs into one UTXO. Predicting directionality/change of future network costs can serve as an input in determining the UTXO selection strategy and determining the number and/or size of the spendable UTXOs that a distributed ledger-based account needs to have available at any given moment. Additionally, enabling user input to define future transaction amounts and frequency can further enhance the optimization of UTXO selection.

In one example, a computer can monitor network traffic on a blockchain computing network. Responsive to receiving a transaction request associated with a distributed ledger-based account (e.g., a cryptographic wallet associated with the blockchain computing network) and based on the monitored network traffic, the computer can determine a current level of network congestion on the blockchain computing network. The computer can execute a transaction cost machine learning model (e.g., a first machine learning model) that predicts a timeseries of future transaction costs based on historical transaction data and the current level network congestion level of the blockchain computing network. The computer can also execute a wallet behavior machine learning model (e.g., a second machine learning model) to predict a timeseries of future transaction sizes and UTXO types for the distributed ledger-based account based on historical transaction data of transactions performed by the distributed ledger-based account. The computer can select (e.g., using one or more rules and/or an optimization function that minimizes transaction costs across the predicted transactions) one or more UTXOs to use to complete the transaction of the transaction request based on the predicted timeseries of future transaction costs and predicted timeseries of future transaction sizes and UTXO types. The computer can append a block instance containing an identification of the selected one or more UTXOs to the blockchain to complete the transaction. By considering network congestion, future transaction predictions, and change denomination optimization in this way, the computer can optimize transaction costs, reduce UTXO inflation, reduce dust, and enhance overall blockchain efficiency compared to conventional techniques of UTXO selection.

In some embodiments, a method includes monitoring, by one or more processors of a computing device in communication with a plurality of nodes maintaining a blockchain, network traffic of transactions performed using the blockchain; and responsive to receiving a transaction request corresponding to a pending transaction between a first distributed ledger-based account and a second distributed ledger-based account, the first distributed ledger-based account corresponding to at least one unspent transaction output (UTXO) stored in one or more block instances of the blockchain: determining, by the one or more processors, a current level of network congestion for the blockchain based on the monitored network traffic; executing, by the one or more processors, a first machine learning model based at least on the determined current level of network congestion to generate a timeseries of one or more predicted transaction costs for the blockchain; executing, by the one or more processors, a second machine learning model based at least on the first distributed ledger-based account to generate a timeseries of one or more predicted transactions for the first distributed ledger-based account; selecting, by the one or more processors, a UTXO to use to complete the pending transaction from the at least one UTXO corresponding to the first distributed ledger-based account based on the generated timeseries of one or more predicted transaction costs and the generated timeseries of one or more predicted transactions; and responsive to selecting the UTXO, appending, by the one or more processors, a block instance corresponding to the pending transaction to the blockchain, the block instance comprising an identification of the selected UTXO.

In some embodiments, a system includes a computing device in communication with a plurality of nodes maintaining a blockchain, wherein the computing device comprises memory having instructions and at least one processor configured to execute the instructions to monitor network traffic of transactions performed using the blockchain; and responsive to receiving a transaction request corresponding to a pending transaction between a first distributed ledger-based account and a second distributed ledger-based account, the first distributed ledger-based account corresponding to at least one unspent transaction output (UTXO) stored in one or more block instances of the blockchain: determine a current level of network congestion for the blockchain based on the monitored network traffic; execute a first machine learning model based at least on the determined current level of network congestion to generate a timeseries of one or more predicted transaction costs for the blockchain; execute a second machine learning model based at least on the first distributed ledger-based account to generate a timeseries of one or more predicted transactions for the first distributed ledger-based account; select a UTXO to use to complete the pending transaction from the at least one UTXO corresponding to the first distributed ledger-based account based on the generated timeseries of one or more predicted transaction costs and the generated timeseries of one or more predicted transactions; and responsive to selecting the UTXO, append a block instance corresponding to the pending transaction to the blockchain, the block instance comprising an identification of the selected UTXO.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

FIG. 3 illustrates a flow diagram of an example method for blockchain network traffic management in accordance with an embodiment.

DETAILED DESCRIPTION

Figure 1:
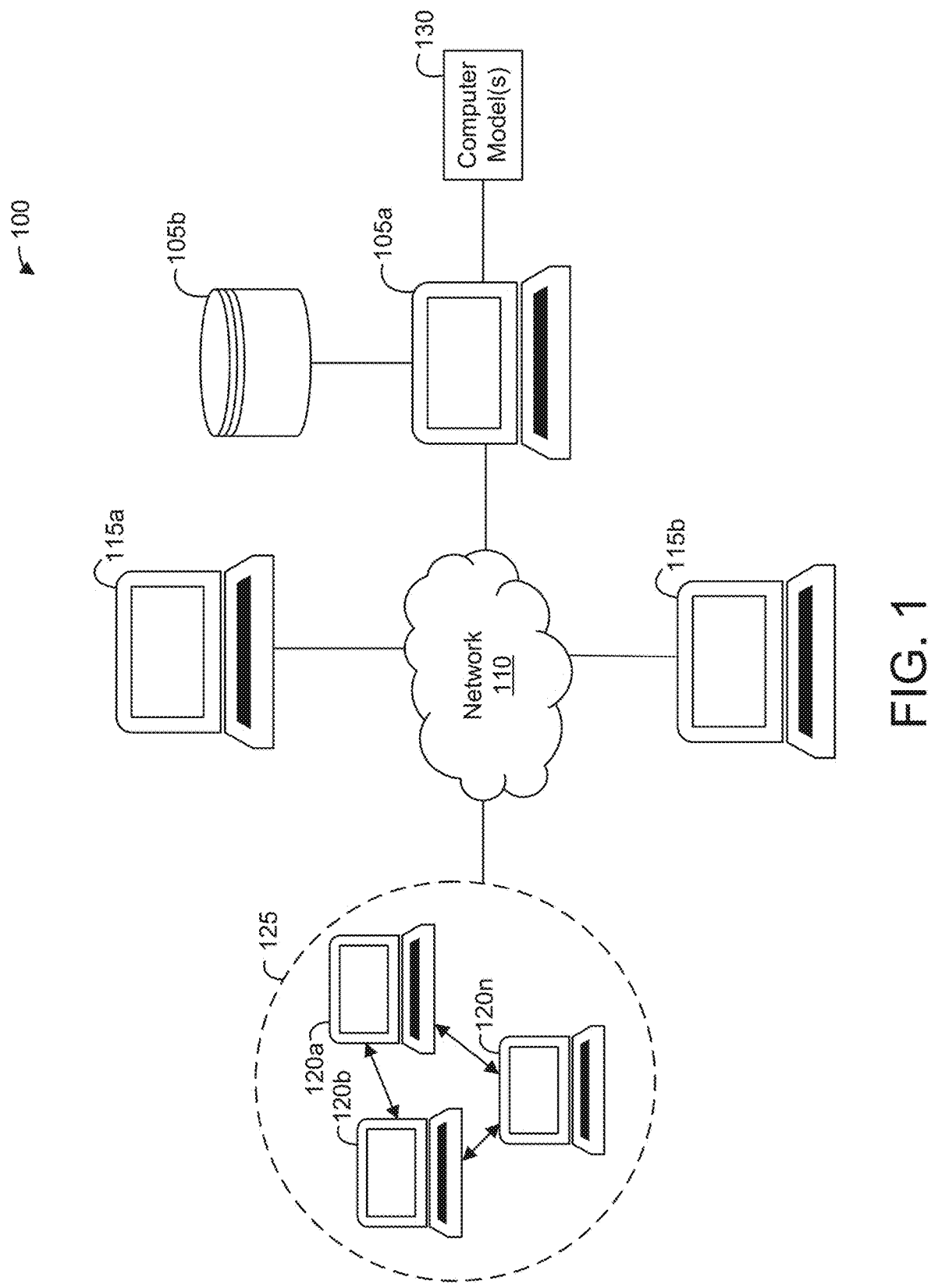
FIG. 1 illustrates a block diagram of an example system for blockchain network traffic management in accordance with an embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of blockchain network traffic management. In a non-limiting example, a computing device can communicate with nodes of a blockchain computing network to facilitate transactions and automatically determine Unspent Transaction Outputs (UTXOs) to use to complete the transactions. The computing device can monitor the network traffic of transactions performed over the blockchain computing network over time. The computing device can receive a transaction request for a pending transaction involving a first distributed ledger-based account receiving a product or service from a second distributed ledger-based account. The computing device can determine a current level of network traffic on the blockchain computing network and use the current level of network traffic as an input into a machine learning model to predict future transaction costs (e.g., predict when transaction costs will be high because of high network traffic and/or low because of low network traffic). The computing device can also use another machine learning model to predict future transactions that the first distributed ledger-based account will perform. The computing device can use the predictions to select one or more UTXOs stored on the blockchain for the first distributed ledger-based account to complete the pending transaction. FIG. 1 depicts an example environment that includes example components of a computing device and blockchain network traffic network that can be used to perform the systems and methods describe. Various other system architectures may include more or fewer features and/or may utilize the techniques described herein to achieve the results and outputs described herein. Therefore, the system depicted in FIG. 1 is a non-limiting example.

FIG. 1 illustrates components of an example blockchain network traffic management system 100, according to an embodiment. The system 100 may comprise an analytics server 105, computing devices 115a-b (individually computing device 115 and together computing devices 115), and a plurality of nodes 120a-c maintaining and/or communicating with a blockchain computing network 125. The analytics server 105 of the system 100 may establish connections with the computing devices 115 to monitor network traffic of transactions performed on the blockchain computing network 125. The analytics server 105 may use the monitored network traffic with machine learning techniques to predict future transaction costs of the blockchain computing network 125. The analytics server 105 can also use historical transaction data and machine learning to predict future transactions of distributed ledger-based accounts involved in the transactions. The analytics server 105 can use these predictions to select UTXOs to use to complete transactions to optimize data transmission and processing on the blockchain computing network 125.

The above-mentioned components may be connected to each other through a network 110. The examples of the network 110 may include, but are not limited to, private or public LAN, WLAN, MAN, WAN, and the Internet. The network 110 may include both wired and wireless communications according to one or more standards and/or via one or more transport mediums.

The communication over the network 110 may be performed in accordance with various communication protocols such as Transmission Control Protocol and Internet Protocol (TCP/IP), User Datagram Protocol (UDP), and IEEE communication protocols. In one example, the network 110 may include wireless communications according to Bluetooth specification sets or another standard or proprietary wireless communication protocol. In another example, the network 110 may also include communications over a cellular network, including, e.g., a GSM (Global System for Mobile Communications), CDMA (Code Division Multiple Access), and/or EDGE (Enhanced Data for Global Evolution) network.

The nodes 120 can be or include computing devices that are configured to maintain a blockchain on the blockchain computing network 125. For example, the nodes 120 can host and maintain a blockchain that is configured to store transaction data for transactions performed between individuals that have distributed ledger-based accounts associated with the blockchain. The nodes 120 may receive transaction data (e.g., transaction records including transaction attributes) from computing devices accessing distributed ledger-based accounts associated with the blockchain and generate block instances to append to the blockchain of the blockchain computing network 125 to complete or perform the individual transactions.

The nodes 120 can append block instances to the blockchain using a consensus algorithm. For example, each of the nodes 120 can store a local copy of the blockchain in memory (e.g., in a local database). For a particular transaction, the nodes 120 can retrieve the respective copies of the blockchain from memory and transmit the copies of the blockchain to other nodes 120 of the blockchain computing network 125. The nodes 120 can append a block instance including the transaction attributes of the transaction to the last block instance of the blockchain responsive to all, a consensus, or a number of nodes 120 above a threshold (e.g., a predetermined threshold) determining matching copies of the blockchain. Upon doing so, the nodes 120 can store updated copies of the blockchain with the appended block instance in the respective local databases.

In some cases, completing a transaction can involve generating a UTXO. For example, if a distributed ledger-based account purchases a product (or service) using a cryptocurrency (e.g., a UTXO) on which the blockchain maintained by the nodes 120 is based, the cryptocurrency may have more value than the agreed upon cost of the product. Because the cryptocurrency may not be split apart, to account for the difference in price and value of the cryptocurrency, the nodes 120 can generate a UTXO for the distributed ledger-based account. The nodes 120 may generate the UTXO to have a size (e.g., a value) equal to the difference in the value between the cryptocurrency token and the agreed upon cost for the product of the transaction. The nodes 120 can append a block instance to the blockchain that includes an identification (e.g., address) for the UTXO, the size of the UTXO, and/or an identification of the distributed ledger-based account for which the UTXO was generated. The nodes 120 can generate UTXOs for different distributed ledger-based accounts associated with the blockchain over time. The nodes 120 can store block instances for the respective UTXOs on the blockchain to maintain a record (e.g., an immutable record) of the ownership of the UTXO.

The nodes 120 can separately maintain a record or a ledger indicating the UTXOs stored on the blockchain and/or the addresses (e.g., identifications of the block instances on which the UTXOs are stored) of the UTXOs. The nodes 120 can store the record or ledger in a file in local memory. The record or ledger can be used to determine which UTXOs the different distributed ledger-based accounts own and/or the addresses that can be used to access or otherwise use the UTXOs to complete or perform transactions.

The computing devices 115 can be computing devices configured to complete transactions using the blockchain computing network 125. For example, a user accessing the computing device 115a can access a first distributed ledger-based account associated with the blockchain computing network 125 that stores digital assets or cryptocurrency on the blockchain of the blockchain computing network 125 for the user. A user accessing the computing device 115b can access a second distributed ledger-based account similar to the first distributed ledger-based account but for the user accessing the computing device 115b. The users can complete transactions using the respective distributed ledger-based accounts via the blockchain of the blockchain computing network 125.

The analytics server 105a may be or include any computing device comprising a processor and non-transitory machine-readable storage capable of executing the various tasks and processes described herein. Non-limiting examples of such computing devices may include workstation computers, laptop computers, server computers, laptop computers, and the like. The analytics server 105a may include one or more application programming interfaces (APIs) that are configured to establish connections and facilitate communication with the computing devices 115 and/or the nodes 120. Although shown separately from the nodes 120, the analytics server 105a can be a node of the nodes 120 and can maintain the blockchain of the blockchain computing network 125 with the other nodes 120, in some configurations.

While the system 100 includes a single analytics server 105a, in some configurations, the analytics server 105a may include any number of computing devices operating in a distributed computing environment.

The analytics server 105a can store or otherwise be coupled with a database 105b. The database 105b can be a relational database, a graph database, MySQL, Oracle, Microsoft SQL, PostgreSql, DB2, document store, search engine, key-value store, etc. The database 105b can be configured to store records of UTXOs (e.g., a list of addresses for the UTXOs and the distributed ledger-based accounts that own or are otherwise associated with the UTXOs) that are stored on the blockchain of the blockchain computing network 125. The database 105b can additionally or instead store transaction data for the transactions that are performed through the blockchain including timestamps for the transactions, the amounts for the transactions, and/or the distributed ledger-based accounts that performed the transactions. The database 105b can additionally or instead store network traffic data indicating the amount of network traffic that is being transmitted across the blockchain computing network 125 or data points of network congestion of the blockchain computing network 125 at different points in time.

The analytics server 105a can use computer models 130 to predict future transaction costs and/or future transactions that the first distributed ledger/based account will perform. The computer models 130 may be stored in memory of the analytics server 105a. The computer models 130 can include a cost prediction model (e.g., a first machine learning model) and/or an account behavior model (e.g., a second machine learning model). Each of the cost prediction model and the account behavior model can be a machine learning model (e.g., a neural network, a random forest, a support vector machine, etc.). In some cases, the cost prediction model can be a convolutional neural network or a recursive neural network to make time-step predictions based on predictions of previous time steps.

The cost prediction model can be configured to predict future transaction costs for the blockchain computing network 125. For example, the cost prediction model can receive as input current network congestion levels and/or historical transaction data of transactions performed by distributed ledger-based accounts associated with the blockchain computing network 125. The analytics server 105a can execute the cost prediction model based on the input to generate a timeseries of predicted transaction costs for one or more future time steps (e.g., every 30 seconds, every minute, every 30 minutes, every hour, every data, etc.). The cost prediction model can be configured to generate such predicted transaction costs for any number of time steps.

The account behavior model can be configured to predict future transactions that a distributed ledger-based account will perform in the future. For example, the account behavior model can receive as input an identification (e.g., a wallet address) of a distributed ledger-based account and/or historical transaction data of transactions performed by the distributed ledger-based account. In some embodiments, instead of receiving an identification of the distributed ledger-based account as input, the account behavior model may be trained based only on historical transaction data of the distributed ledger-based account. In such embodiments, the account behavior model can automatically predict future transactions for the distributed ledger-based account based on historical transactions of the distributed ledger-based account without using the identification of the distributed ledger-based account as input. The analytics server 105a can execute the account behavior model based on the input to generate a timeseries of predicted transactions that the distributed ledger-based account will perform for one or more future time steps (e.g., every 30 seconds, every minute, every 30 minutes, every hour, every day, etc.). The predictions can include the time and/or the size (e.g., amount) of the transactions. The account behavior model can be configured to generate such predicted transactions for any number of time steps.

The analytics server 105a can monitor the network traffic of the blockchain computing network 125. The analytics server 105a can monitor the network traffic by identifying the transactions that are stored in the mempool for the blockchain computing network 125. The mempool can be a temporary storage area for unconfirmed transactions of the blockchain computing network 125. The mempool can be stored in memory (e.g., random access memory (RAM)) of the nodes 120 and the analytics server 105a that maintain the blockchain of the blockchain computing network 125. The analytics server 105a can monitor the network traffic of the blockchain computing network 125 by querying the mempool stored in the analytics server 105a and/or by querying the mempool stored in one or more of the nodes 120 maintaining the blockchain. The analytics server 105a can determine the network traffic to be a count of the number of transactions for which data is stored in the mempool. In some cases, the analytics server 105a can query the mempool over time to identify the network traffic as a running average or median of transactions for which data is stored in the mempool. The determined network traffic can be the network congestion level at a point in time or for a time window.

In some cases, the analytics server 105a can monitor the network traffic by maintaining a record of the number of messages and/or signals that the analytics server 105a receives and/or transmits to the nodes 120 to maintain the blockchain. The analytics server 105a can maintain and increment a counter for the messages that the analytics server 105a receives and/or transmits to append blocks to the blockchain. The analytics server 105a can determine the count of the counter in a moving time window to maintain a record of the number of messages and/or signals that the analytics server 105a transmits and/or receives within the blockchain computing network 125. In some cases, the analytics server 105a can use or operate as a network probe and detect the messages and/or signals that the nodes 120 transmit between each other. The analytics server 105a can determine the current level of network congestion or network traffic as or based on a count of such messages similar to the above. The analytics server 105a can store records of the determined levels of network congestion in the database 105b as the analytics server 105a monitors the blockchain computing network 125.

The analytics server 105a can receive a request for a pending transaction. The analytics server 105a can receive the request from the computing device 115a, for example. The pending transaction can be a transaction for a first distributed ledger-based account accessed through the computing device 115a to purchase a product or service from a second distributed ledger-based account accessed through the computing device 115b. Responsive to receiving the request, the analytics servers 105a can determine a current level of network congestion. The analytics server 105a can do so by identifying the number of unconfirmed transactions that are currently stored in the mempool (e.g., by querying the mempool stored in memory of the analytics server 105a or querying the mempool of a node 120 of the blockchain computing network 125), identify a most recently determined level of network congestion from memory or the database 105b, or by identifying a count of a counter that the analytics server 105a maintains indicating the number of messages or signals that are transmitted across the blockchain computing network 125.

The analytics server 105a can use the computer models 130 to generate predictions for future transaction costs of the blockchain computing network 125 and/or future transactions that the first distributed ledger-based account will perform. For example, responsive to receiving the request and/or determining the current level of network congestion of the blockchain computing network 125, the analytics server 105a can execute the cost prediction machine learning model using the current congestion level and/or historical transaction data of transactions performed through the blockchain computing network 125 as input. Based on the execution, the cost prediction model can apply learned weights and/or parameters to the input to generate a timeseries of one or more predicted transaction costs (e.g., transaction fees) of the blockchain computing network 125 at one or more time steps (e.g., one or more future time steps). The analytics server 105a can additionally or instead execute the account behavior model based on the first distributed ledger-based account, in some cases using an identification of the first distributed ledger-based account and/or historical transactions performed by the first distributed ledger-based account as input. Based on the execution, the account behavior model can apply learned weights and/or parameters to the input to generate a timeseries of one or more transactions that the first distributed ledger-based account will perform at one or more time steps (e.g., one or more future time steps).

The analytics server 105*a* can select one or more UTXOs to use to complete the pending transaction of the first distributed ledger-based account based on the generated timeseries of one or more predicted transaction costs and the generated timeseries of one or more predicted transactions for the first distributed ledger-based account. For example, the analytics server 105*a* can apply one or more rules to the two timeseries. One example of such a rule can be determining whether the current transaction cost of completing a transaction via the blockchain computing network 125 is higher than the transaction costs in the timeseries of predicted transaction costs. Responsive to determining the transaction cost is higher, the analytics server 105*a* can identify or select the UTXO with the largest size (e.g., the highest value) that is needed to complete the pending transaction (e.g., complete the transaction alone or in combination with one or more other UTXOs). However, responsive to determining the transaction cost is lower than the predicted transaction costs, the analytics server 105*a* can identify or select multiple smaller UTXOs that, together, have a size that meets or exceeds the value of the transaction. Because the transaction costs can correlate with the amount of network traffic of the blockchain computing network 125 at any given time, using fewer UTXOs when network traffic is high and more UTXOs when network traffic is low can conserve computing resources in validating and updating the blockchain with the transactions. Each UTXO can include data (e.g., bytes) that need to be processed when used in a transaction, so using this process can conserve or otherwise optimize processing resources by spreading out transactions that involve using multiple or large numbers of UTXOs for transactions at times that are predicted to have low network traffic with low transaction costs and vice versa.

In some cases, the analytics server 105*a* can additionally or instead use the predicted transactions for the first distributed ledger-based account to select the one or more UTXOs to complete the pending transaction. For example, when applying the rules to the two timeseries, the analytics server 105*a* can determine the UTXOs that would be needed to complete the pending transaction and the predicted transactions of the timeseries of predicted transactions. The analytics server 105*a* can do so, for example, by identifying a number of UTXOs with sizes that aggregate to a value that meets or exceeds the value of the pending transaction to be used to complete the transactions. The analytics server 105*a* can determine specific UTXOs to use to perform or complete the current pending transaction and each of the predicted transactions by identifying combinations of UTXOs that meet or exceeds the values of the pending transaction and the timeseries of predicted transactions.

The analytics server 105*a* can use one or more rules on the combination of timeseries to identify or select the one or more UTXOs to use to complete the transaction. For example, the analytics server 105*a* can select UTXOs that can be used to complete the current transaction and the predicted future transactions and that take into account the transaction costs of performing the transactions. The analytics server 105*a* can do so, for example, using an optimization function that optimizes the transaction fees (e.g., minimizes the transaction fees that will be incurred in completing the pending transaction and the predicted transactions) while ensuring the UTXOs that are necessary to complete the transactions are still available for each future transaction. The analytics server 105*a* can select one or more UTXOs that the optimization function indicates will optimize the optimization function for the current pending transaction and the timeseries of predicted transactions. The analytics server 105*a* can complete or perform the pending transaction with the selected UTXOs for the pending transaction.

The analytics server 105*a* can additionally or instead use the predicted timeseries data to reduce the probability of creating dust (e.g., UTXOs with sizes that are too small to use) when performing the predicted transactions. The analytics server 105*a* can do so by combining UTXOs corresponding to the first distributed ledger-based account based on the timeseries of transaction costs when the transaction costs (e.g., the processing costs) are predicted to be low in the predicted timeseries data. For example, the analytics server 105*a* can determine that using one or more UTXOs to complete one of the predicted transactions of the timeseries of predicted transaction will create dust because the size of the one or more UTXOs may not exceed the value of the transaction by more than a threshold. Responsive to the determination, the analytics server 105*a* can identify another UTXO that corresponds to the first distributed ledger-based account and combine identified UTXO with the one or more UTXOs, thus creating a larger UTXO that can be used in the transaction without resulting in dust. The analytics server 105*a* can combine the UTXOs at a time in which the timeseries of predicted transaction costs indicates transaction costs are low to reduce the processing strain on the blockchain computing network 125.

Responsive to selecting the UTXO, the analytics server 105*a* can append a block instance corresponding to the pending transaction to the blockchain of the blockchain computing network. The analytics server 105*a* can do so, for example, by transmitting messages or signals to the nodes 120 indicating to complete the transaction with the selected UTXO and/or any other cryptocurrency that is required to complete the pending transaction. The analytics server 105*a* can generate instructions to append a block instance for the transaction that includes the data for the transaction and transmit the instructions to the nodes 120. The nodes 120 can operate according to the instructions and append the block instance for the transaction to the blockchain. In doing so, the nodes 120 can include an identification of the selected UTXO, identifications of any other cryptocurrency that was used to complete the transaction, and/or identifications of the first and second distributed ledger-based accounts in the block instance.

Figure 2:
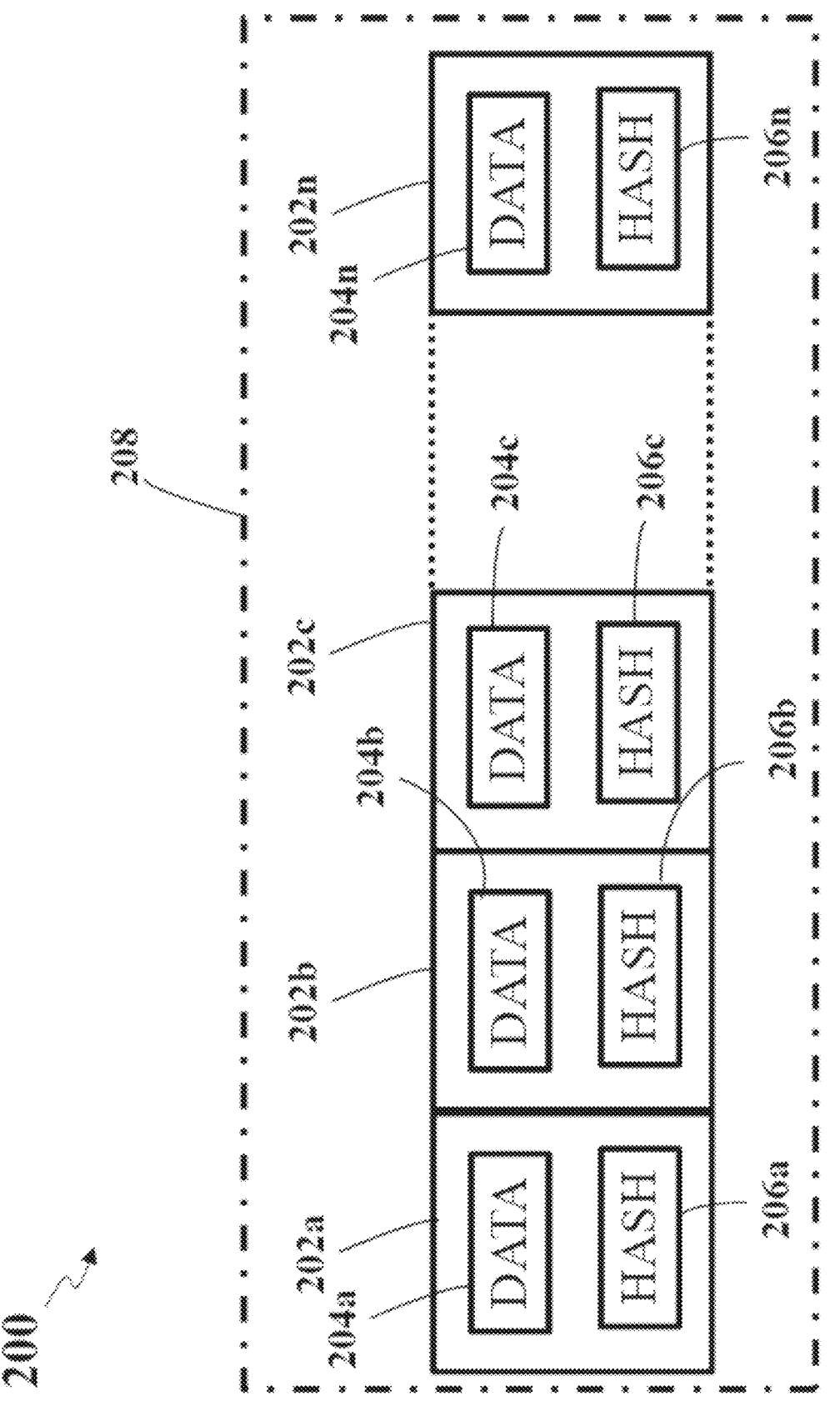
FIG. 2 graphically illustrates an example of appending multiple block instances in accordance with an embodiment.

Referring now to FIG. 2, an example of a system blockchain comprising different block instances is illustrated. As depicted in FIG. 2, a blockchain 208 comprising block instances 202*a*-202*n* (collectively, block instances 202) may include data 204*a*-204*n* (collectively, data 204) that enables information, such as transaction data (e.g., transaction attributes and values), machine-readable code/documents, and other metadata associated with one or more transactions of the peer nodes described above. The block instances 202 may also contain hash values 206*a*-206*n* (collectively, hash values 206) that are used to link each of the block instances to the preceding block instance, as understood in the art. The blockchain 208 is an example blockchain that the nodes 120, described with reference to FIG. 1, can maintain to facilitate transactions or manage transaction performed on the blockchain 208.

Peer nodes (e.g., the nodes 120) may generate (or instruct a blockchain service to generate) the block instance 202*a* (e.g., the genesis block). The peer nodes may receive data 204*a* from a first peer node or a first computing device via a graphical user interface (GUI) provided by the peer nodes or an analytics server (e.g., the analytics server 105*a*). For example, an administrator using the first computing device may log in to a website hosted or otherwise associated or managed by the analytics server and transmit data 204*b* (e.g., a transaction record) to the peer nodes. The peer nodes may verify the data 204*b* against data of a corresponding transaction record. Responsive to determining the data matches, the peer nodes may generate a block instance for the blockchain that they maintain. The peer nodes may also or instead transmit instructions to the peer nodes to generate a corresponding block instance and append the block instance to the blockchain that the peer nodes maintain by identifying a quorum and as described herein. Upon generation of the block instance 202*b*, the peer nodes may generate the hash value 206*b* based on the data 204*b* (and/or data of the immediately previous block instance), and/or an identifier of the first computing device, and/or other identifier information (e.g., timestamp and/or geolocation).

The peer nodes may also generate (or instruct a blockchain service to generate) the block instance 202*c*. The peer nodes may receive data 204*c* from a second computing device (e.g., a second peer node) via a GUI provided by the analytics server or the peer nodes on the second computing device. For example, an administrator using the second computing device may log in to a website hosted or otherwise managed by the analytics server or the peer nodes and the second computing device may transmit data 204*c* to the peer nodes. The peer nodes may generate a hash value 206*c* based on the data 204*c*, an identifier of the second peer node, and/or other identifier information (e.g., timestamp and/or geolocation).

The hash value 206*c* may be based on the hash value 206*b* and/or the data 204*c*. The peer nodes may incorporate the hash value 206*b* into the hash value 206*c* to append the block instance 202*c* to the block instance 202*b*. The peer nodes may subsequently poll all the peer nodes to ensure the highest integrity of the blockchain by appending the latest block instance to the latest valid blockchain instances (e.g., the last blockchain for which there was a quorum). Using this method, blockchain instances within the blockchain 208 may be appended to the preceding blockchain instance. The peer nodes may generate block instances 202*c*-*n* using the same methods explained above to continuously update the blockchain 208. As depicted, block instances 202*a*, 202*b*, 202*c*, and 202*n* are connected because of synchronization of hash values 206*a*, 206*b*, 206*c*, and 206*n*.

In some configurations, additional information, such as an identifier associated with peer nodes adding or updating the data could also be included within the blockchain or incorporated into the hash value. As an example, if a peer node adds any data to the blockchain, an identifier associated with the computing device that contributed to creating the data may be included in the respective block. In some embodiments, the identifier may include a timestamp (e.g., data regarding the time of data modification or creation) and/or a geolocation (e.g., data regarding the location within which the data modification or creation has occurred or has a value based on the user's geo-location). The identifier may also be incorporated within the hash value and may be used by the peer nodes as a part of the hashing algorithm. Such identification information may be used as a veracity scale factor that the information is true and accurate.

In some cases, UTXOs may be added to the blockchain 208. For example, the blockchain 208 may be configured to store a particular cryptocurrency. The cryptocurrency may be used to perform transactions between distributed ledger-based accounts associated with the blockchain 208. When the value of the cryptocurrency exceeds the values of the transactions for which the cryptographic tokens were used, the peer nodes maintaining the blockchain 208 may generate UTXOs for the respective transactions with values equal to the respective differences. The cryptocurrency itself can be or include UTXOs. The peer nodes can append block instances to the blockchain 208 for the respective UTXOs to maintain a record of the UTXOs with which the distributed ledger-based accounts are associated.

The peer nodes may transmit the blockchain instances to all the peer nodes of the blockchain to preserve the integrity of the blockchain. For example, the peer nodes may transmit the hash value 206*c* (e.g., the hash value generated for block instance 202*c* based on data 204*c* received from a third node) to the first node (e.g., the first computing device associated with the block instance 202*a*) and the second node (e.g., the second computing device associated with the block instance 202*b*). Consequently, when the nodes of the blockchain are polled, they will not verify the modified block.

Modification of data within a block instance may disconnect that block instance from the blockchain. The peer nodes may use this method to combat possible fraud or unauthorized modification of the data within blockchain instances. For example, if the second administrator using the second computing device modifies data 204*b* within block instance 202*b*, the hash value 206*b* will also be modified. As explained above the hash value 206*b* may be based on (or at least partially based on) data 204*b*. Therefore, if data 204*b* is modified, the hash value 206*b* will also be modified. Modification of the data 204*b* or the hash value 206*c* may break the link between block instance 202*b* and block instance 202*c* because hash value 206*c* is at least in part generated based on hash value 206*b*.

FIG. 3 illustrates a flow diagram of an example method 300 for blockchain network traffic management in accordance with an illustrative embodiment. However, other embodiments may include additional or alternative execution steps, or may omit one or more steps altogether. The method 300 is described as being executed by an analytics server, similar to the analytics server described in FIG. 1. However, one or more steps of the method 300 may also be executed by any number of computing devices operating in the distributed computing system described in FIG. 1. For instance, one or more computing devices (e.g., user devices) may locally perform part or all of the steps described in FIG. 3. Moreover, one or more of the steps of the method 300 can be performed via any processor of the system, such as any processor of the system 100.

At step 302, the analytics server monitors network traffic of transactions performed using a blockchain. The blockchain can be maintained by one or more nodes. In some cases, the analytics server can be a node of the one or more nodes that maintain the blockchain. The analytics server can monitor the network traffic by querying a mempool for the blockchain. The mempool can include one or more unconfirmed transactions that have not yet been appended to the blockchain. The mempool can be stored in memory (e.g., random access memory (RAM)) of the analytics server and/or in memory of one or more of the nodes that are maintaining the blockchain. The nodes maintaining the blockchain can select transactions from the mempool and verify the transactions before appending block instances to the blockchain for the selected transactions. Individual block instances can contain data for multiple transactions, in some cases.

The analytics server can query the mempool at set or random intervals or frequencies and/or responsive to receive requests to do so. For instance, the analytics server can query the mempool in memory of the analytics server or by querying a node of the nodes maintaining the blockchain to determine the number of unconfirmed transactions that are stored in the mempool. In doing so, the analytics server can determine the number of pending transactions that are stored in the mempool at the time of the query, such as by incrementing a counter for each pending transaction that the analytics server identifies from the mempool. The analytics server can store the determined count in memory or in a database in memory. The analytics server can do so over time to maintain a record of network traffic or network congestion on the blockchain over time.

In some configurations, the analytics server can monitor the network traffic of the blockchain by monitoring messages that are sent between the nodes of the blockchain. For example, the analytics server can use network monitoring equipment to detect messages or network packets that are transmitted between the nodes that maintain the blockchain. The analytics server can maintain and increment a counter for each of the network packets that the analytics server detects. The analytics server can increment the counter over time to maintain an active count of the network traffic of the blockchain. The analytics server can reduce the counter as different incremented counts age out (e.g., decrement the counter a defined amount of time after a particular increment of the counter). Thus, the analytics server can determine the network traffic in a moving time window to generate a view of network traffic of the blockchain over time. The analytics server can store counts of the counter that the analytics server identifies at set time intervals in memory or in a database to maintain a record of network traffic on the blockchain. The analytics server can monitor the messages of the blockchain in this way in addition to or instead of monitoring the mempool for unconfirmed transactions.

At step 304, the analytics server can receive a transaction request. The transaction request can correspond to a pending transaction between a first distributed ledger-based account and/or a second distributed ledger-based account. The analytics server can receive the transaction request from a computing device hosting or otherwise accessing one or both of the first distributed ledger-based account or the second distributed ledger-based account. The pending transaction can include transaction attributes for the transaction. For example, the transaction request can include an identification of a product or service that the second distributed ledger-based account is transferring to the first distributed ledger-based account and a cost or value (e.g., price) of the transaction. The transaction request can also include identifications or addresses of the first distributed ledger-based account and the second distributed ledger-based account. In some cases, the analytics server can receive the transaction request through a platform that the analytics server hosts to facilitate transactions that are performed on the blockchain.

The first distributed ledger-based account can correspond to at least one unspent transaction output (UTXO). UTXOs can be the remainder of cryptocurrency after the cryptocurrency is used to perform a transaction. The UTXOs that correspond with the first distributed ledger-based account can be UTXOs that were generated by the blockchain when the first distributed ledger-based account performed transactions through the blockchain. The UTXOs can be stored in one or more block instances on the blockchain each with an identification of the first distributed ledger-based account and/or a size (e.g., amount) of the UTXO.

Responsive to receiving the transaction request, at step 306, the analytics server determines a current level of network congestion for the blockchain. The current level of network congestion can indicate the amount of transactions that are currently being performed through the blockchain or the amount of messages that are being communicated between the nodes (e.g., to perform or complete transaction on the blockchain) that maintain the blockchain, for example. In some configurations, the analytics server can determine the current level of network congestion by querying the mempool for the blockchain stored in memory of the analytics server or otherwise stored in memory of a node that maintains the blockchain. Based on the query, the blockchain can determine a count of the number of unconfirmed transactions that are stored in the mempool. The count can be the current level of network congestion or the analytics server can determine the current level of network congestion as a function (e.g., average, sum, media, etc.) of the count. In some cases, the current level of network congestion can indicate the amount of transactions that are stored in the mempool for a defined time period. The analytics server can query mempool at a set frequency during the defined time period (e.g., while monitoring the network traffic of transactions performed on the blockchain) and determine counts of transactions in the mempool for each query. The analytics server can determine the current level of network congestion based on transactions in the mempool using any method.

In some configurations, the analytics server can determine the current level of network congestion by monitoring messages that are transmitted between the nodes that maintain the blockchain. The analytics server can monitor the messages using network monitoring equipment, such as a probe or other network monitoring appliances. In some cases, the analytics server can use or only use messages that the analytics server receives and/or transmits to maintain or update the blockchain. The analytics server can maintain and increment a counter for each message or signal from the nodes that maintain the blockchain that the analytics server detects. The analytics server can decrement or reduce the counter for a count a defined amount of time after the counter was incremented for the count such that the counter represents a moving time window of messages that are transmitted between the nodes that maintain the blockchain. The count can be the current level of network congestion or the analytics server can determine the current level of network congestion as a function (e.g., average, sum, media, etc.) of the count. The analytics server can determine the current level of network congestion based on messages that are transmitted between nodes of the blockchain using any method.

At step 308, the analytics server executes a first machine learning model (e.g., a transaction cost model). The first machine learning can be or include a neural network (e.g., a convolutional neural network or a recursive neural network), a support vector machine, a random forest, etc.). The analytics server can execute the first machine learning mode based at least on the determined current level of network congestion. For example, the analytics server can input the determined current level of network congestion into the first machine learning model and execute the first machine learning model. Based on the execution, the first machine learning model can output a timeseries of predicted transaction costs for transactions performed through the blockchain.

The timeseries of predicted transaction costs can be or include values of transaction costs at different time steps into the future. The transaction costs can vary between time steps and can correspond to the levels of network congestion on the blockchain. For example, transaction costs may be higher when network congestion is high because there are fewer processing resources to process the transactions and vice versa. The analytics server can be configured and/or trained to output a transaction cost for each of a set of defined time steps into the future.

In some cases, the first machine learning model can generate the timeseries of one or more predicted transaction costs based on transaction data of historical transactions that were performed by different distributed ledger-based accounts through the blockchain. For example, as transactions are performed through the blockchain through different distributed ledger-based accounts, the analytics server can store records of the transactions in memory. The records can include data regarding the transactions, such as the parties involved in the transactions, the timestamps for the transactions, and/or the amounts of the transactions. The analytics server can retrieve the historical transaction records from memory, such as by retrieving all of the historical transaction records from memory, retrieving a defined number of transaction records (e.g., transaction records associated with the most recent transactions), and/or retrieving transaction records for transactions that occurred or were completed within a defined time window. The analytics server can generate a feature vector from the retrieved transaction records and the determine current level of the network congestion on the blockchain. The analytics server can input the feature vector into the first machine learning model and execute the first machine learning model. The first machine learning model can output the timeseries of one or more predicted transaction costs based on the execution.

The analytics server may train the first machine learning model to generate a timeseries of predicted transaction costs. For example, the analytics server may train the first machine learning model using a supervised training method in which current levels of network congestion and/or historical transaction data of different distributed ledger-based accounts, is input as a feature vector into the first machine learning model and the analytics server executes the first machine learning model. The feature vector may have been labeled with a ground truth timeseries of predicted transaction costs. The first machine learning model may be trained using back-propagation techniques and a loss function in which the internal weights and/or parameters of the first machine learning model are modified (e.g., by the analytics server) based on a difference between the output timeseries of predicted transaction costs and the ground truth or the "correct" timeseries of predicted transaction costs. In doing so, the first machine learning model may be trained based on actual transaction costs from the past in relation to the level of network congestion of the blockchain a defined time before the actual transaction costs.

At step 310, the analytics server executes a second machine learning model (e.g., an account behavior model). The second machine learning can be or include a neural network (e.g., a convolutional neural network or a recursive neural network), a support vector machine, a random forest, etc.). The analytics server can execute the second machine learning mode based at least on the first distributed ledger-based account. For example, in some configurations, the analytics server can input the identification of the first distributed ledger-based account into the first machine learning model and execute the first machine learning model. The analytics server may have retrieved the identification of the first distributed ledger-based account from the transaction request for the pending transaction. The analytics server can include other data in the input, such as a timestamp of the current time or any other metadata. In some configurations, the analytics server can input historical transaction data of data transactions performed by the first distributed ledger-based account into the second machine learning model. In doing so, the analytics server can generate a feature vector containing all of the historical transaction records of transactions performed (e.g., only performed) by the first distributed ledger-based account from memory, a defined number of historical transaction records of transactions performed (e.g., only performed) by the first distributed ledger-based account, and/or transaction records for transactions that occurred or were completed within a defined time window. The analytics server can include the identification of the first distributed ledger-based account in the feature vector. The analytics server can input the feature vector into the second machine learning model. The analytics server can execute the second machine learning model based on the input. Based on the execution, the second machine learning model can output a timeseries of predicted transactions for transactions performed by the first distributed ledger-based account.

In some cases, the second machine learning model can predict UTXO types for predicted transactions. UTXO types can be, for example, standard UTXOs, segregated witness UTXOs, Pay-To-Script-Hash UTXOs, nested segregated witness UTXOs, time-locked UTXOs, etc. The predicted UTXO types can indicate the types of UTXOs that are predicted will need to be used to perform the predicted transactions, for example.

The analytics server may train the second machine learning model to generate a timeseries of predicted transaction transactions. For example, the analytics server may train the second machine learning model using a supervised training method in which historical transaction data with identifications of different distributed ledger-based accounts are input as a feature vector into the second machine learning model and the analytics server executes the second machine learning model. The transaction data can be from transactions performed by multiple distributed ledger-based accounts. The feature vector may have been labeled with a ground truth timeseries of data for different transactions. The second machine learning model may be trained using back-propagation techniques and a loss function in which the internal weights and/or parameters of the second machine learning model are modified (e.g., by the analytics server) based on a difference between the output timeseries of predicted transactions and/or UTXO types and the ground truth or the "correct" timeseries of predicted transactions. In doing so, the second machine learning model may be trained to predict a pattern of future transactions based historical transaction data of different distributed ledger-based accounts. Because the second machine learning model may be trained with identifications that correspond to distributed ledger-based accounts, the training can enable the second machine learning model to simulate transaction behavior of the distributed ledger-based accounts based on the identifications of the distributed ledger-based accounts.

In another example, in some configurations, the second machine learning model can be dedicated to or be configured to simulate the first distributed ledger-based account. For example, the analytics server can train the second machine learning model as described above but only using historical transaction data of transactions performed by the first distributed ledger-based account through the blockchain. In doing so, the analytics server can generate and train the second machine learning model to create a pattern or model of transactions that the first distributed ledger-based account performs. The analytics server can similarly train any number of machine learning models to simulate different distributed ledger-based accounts based on transaction data specific to the accounts in this manner. The analytics server can select the second machine learning model from the trained machine learning models to use to predict a timeseries of transactions based on the identification of the first distributed ledger-based account in the transaction request. The analytics server can generate a feature vector of historical transaction data of the first distributed ledger-based account, as described above, but not include the identification of the first distributed ledger-based account in the feature vector. The analytics server can execute the second machine learning model based on the input to cause the second machine learning model to output a timeseries of predicted transactions and/or UTXO types that are predicted to be performed by the first distributed ledger-based account. training the model in this manner can result in more accurate outputs can because the weights may not be adjusted distributed ledger-based accounts that perform different transaction patterns.

The timeseries of transactions can be or include one or more values for attributes for transactions performed at different time steps. For example, the timeseries of transactions can at least include timestamps for the transactions predicting when the transactions will occur and sizes of the transactions. The analytics server may execute the second machine learning model to predict the times of the transactions of the timeseries of transactions such that the attributes (e.g., time and/or size) of each predicted transaction are at least based on the previous predicted transaction or predicted transactions. The transaction sizes and the differences in times between the transactions can vary based on the profile of the first distributed ledger-based account. The second machine learning model can be configured and/or trained to output data for any number of transactions and/or do so for a defined period of time into the future.

At step 312, the analytics server selects a UTXO. The analytics server can select the UTXO, in some cases with one or more other UTXOs, to use to complete the pending transaction. The analytics server can select the UTXO by applying one or more rules to the timeseries of predicted transactions and the timeseries of predicted transaction costs. For instance, the analytics server can apply one or rules to the two timeseries to select a combination of UTXOs that corresponds to (e.g., that are owned by) the first distributed ledger-based account to use for each transaction of the timeseries of predicted transactions and the current pending transaction while minimizing the transaction costs of performing the transactions. The analytics server can identify and select the determined UTXOs for the current pending transaction to use to complete the current pending transaction. Accordingly, the analytics server can use the timeseries to ensure the first distributed ledger-based account has enough UTXOs to complete the predicted timeseries of transactions while reducing the processing costs of completing the transactions by allocating more UTXOs to the predicted transactions that are associated with times that are predicted to have lower transaction costs.

For example, the analytics server can identify the UTXOs that correspond with the first distributed ledger-based account. The analytics server can identify the UTXOs by querying a list of UTXOs that the analytics server stores in memory or by querying a node of the nodes maintaining the blockchain for such a list. The list can contain a list of identifications of UTXOs, addresses of the UTXOs, sizes of the UTXOs, and/or identifications of the distributed ledger accounts associated with (e.g., that own) the UTXOs. In some cases, the list can indicate the types of the UTXOs. The analytics server can query the list using the identification of the first distributed ledger-based account as a key to identify UTXOs that correspond with the first distributed ledger-based account and that the first distributed ledger-based account can therefore use to complete transactions. In some configurations, the analytics server can query a similar list of UTXOs that correspond with the first distributed ledger-based account that is stored in the first distributed ledger-based account to identify the UTXOs. The analytics server can similarly identify cryptographic tokens that correspond with the first distributed ledger-based account.

Upon identifying the UTXOs that correspond with the first distributed ledger-based account, the analytics server can apply rules to the identified UTXOs and/or timeseries of predicted transaction costs and/or predicted transactions for the first distributed ledger-based account. In some cases, the analytics server may apply the rules to select UTXOs that satisfy the UTXO types of the predicted transactions (e.g., limit or filter the UTXOs that can be selected for individual predicted transactions to the types of UTXOs for the predicted transactions). In one example, the analytics server can compare sizes of the identified UTXOs with each other to generate a list of the UTXOs (e.g., at least one UTXO) ordered based on size. The analytics server can compare the current transaction cost of the blockchain with the transaction costs of the timeseries of predicted transaction costs. The analytics server can select a UTXO to use responsive to determining the size of the UTXO exceeds one or more of the sizes of the other UTXOs (e.g., responsive to determining the UTXO is the largest), and (ii) responsive to determining the current transaction cost is higher than one or more transaction costs of the timeseries of predicted transaction costs. By doing so, the analytics server may reduce the processing resources that are required to perform the pending transaction by only using one large UTXO to complete the transaction instead of multiple smaller UTXOs at a time when there are limiting processing resources available to complete the transaction (e.g., when the nodes maintaining the blockchain are processing a large amount of transactions, which may correspond to or be the cause of the high transaction costs). Processing each UTXO can require processing the data (e.g., the bytes) of the UTXO, so reducing the number of UTXOs that are used to complete transactions when the transaction costs are high and processing resources are low can reduce the strain on the blockchain computing network to complete the transaction.

The analytics server may use multiple smaller transactions for a transaction when the transaction cost is lower and the blockchain computing network is processing fewer transactions. For example, the analytics server can compare sizes of the identified UTXOs with each other to generate a list of the UTXOs (e.g., at least one UTXO) ordered based on size. The analytics server can compare the current transaction cost of the blockchain with the transaction costs of the timeseries of predicted transaction costs. The analytics server can determine multiple or a plurality of UTXOs have a size lower than one or more sizes of other UTXOs of the list of UTXOs that correspond with the first distributed ledger-based account. The analytics server can also determine the transaction cost for the pending transaction is lower than one or more transaction costs of the timeseries of predicted transaction costs. Responsive to both determinations, the analytics server can use the plurality of UTXOs to complete the transaction. Accordingly, the nodes that maintain the blockchain can process the transaction that may require more processing power with the multiple UTXOs when there is less network traffic on the blockchain and more processing resources available.

The analytics server can determine a time to complete the pending transaction based on the timeseries of transaction costs. For example, the analytics server can identify the transaction costs of the timeseries of predicted transaction costs. The analytics server can identify the lowest transaction cost of the timeseries and the time associated with the lowest transaction cost. The analytics server can wait to complete the transaction until the identified time associated with the lowest transaction cost. In some cases, the first distributed ledger-based account or the second distributed ledger-based account can input a time frame for the transaction to be completed. In this case, the analytics server can identify the time within the time frame that is associated with the lowest transaction cost and complete the transaction at the identified time.

The analytics server can select one or more UTXOs to complete the pending transaction. The analytics server can do so by selecting the UTXOs that meet or exceed a value of a product or service that the first distributed ledger-based account is purchasing from the second distributed ledger-based account in the pending transaction.

In some configurations, the analytics server can use an optimization function or an objective function to select UTXOs and cryptographic tokens to use to complete the pending transaction. For example, the analytics server can use an optimization function that optimizes the transaction fees (e.g., minimizes the transaction fees or processing resources that will be incurred in completing the transactions) while ensuring the UTXOs and cryptographic tokens that are necessary to complete the transactions are still available for each predicted transaction of the timeseries of predicted transactions. The analytics server can select one or more UTXOs to perform the current transaction that the optimization function indicates will optimize the optimization function for the timeseries of predicted transactions.

In some cases, the analytics server can use input data in addition to the predictions from the first and second machine learning models to select the UTXOs for the transactions. For example, in addition to or in place of at least one of the predicted transactions from the second machine learning model, the first distributed ledger-based account can transmit transaction data for one or more transactions that the first distributed ledger-based account will perform to the analytics server. The transaction data can include a time or a time frame in which the transaction will be completed or initiated and a value for the transaction. The first distributed ledger-based account can transmit such transaction data for any number of transactions. The analytics server can use the transaction data for the transaction or the transaction in combination or in place of one or more of the transactions predicted by the second machine learning model to select the UTXOs to use for the pending transaction, the predicted transactions, and/or the transmitted transactions. Thus, the analytics server may not rely only on predictions from the second machine learning model during the optimization of the UTXO selection.

In some configurations, the analytics server can use profiles for individual distributed ledger-based accounts to determine a set of rules for the optimization function to select UTXOs for pending transactions and/or predicted transactions. For example, the analytics server can store preferences for the individual distributed ledger-based accounts as profiles. The preferences can indicate frequencies with which the distributed ledger-based accounts perform transactions, time frames in which the distributed ledger-based accounts typically prefer initiated transactions to be completed, recurring transactions associated with the distributed ledger-based accounts, etc. In some cases, the analytics server can determine such preferences using a clustering algorithm (e.g., K-Means clustering, fuzzy clustering, density-based clustering, etc.). For example, the analytics server can cluster the distributed ledger-based accounts based on historical transaction data of the respective distributed ledger-based accounts. The analytics server can generate profiles of the individual distributed ledger-based accounts based on the clusters in which the distributed ledger-based accounts are assigned and insert the same preferences in the profiles of distributed ledger-based accounts of the same cluster. The analytics server can use the preferences as variable inputs into the second machine learning model to predict future transactions or as rules for the optimization function to follow when selecting UTXOs to perform pending transactions and/or predicted transactions.

In some configurations, the analytics server can use the rules to avoid creating dust (e.g., UTXOs with a size below a threshold or that are otherwise too small to be used to complete transactions) from the UTXOs that correspond with the first distributed ledger-based account. For example, when the analytics server determines UTXOs to use to complete the current pending transaction and the timeseries of predicted transactions, the analytics server can do so by ensuring using the UTXOs in the transactions will not result in the creation of further UTXOs (e.g., UTXOs created as a result of completing the current pending transaction and/or the predicted transactions) that have a size below a threshold.

In another example, the analytics server can identify optimal times to combine UTXOs together. The analytics server can combine UTXOs together to increase the size of the UTXOs and thus reduce the chances of creating dust when using the UTXOs to complete transactions. In one example, the analytics server can identify times or instances in which the transaction costs are low from a predicted timeseries of transaction costs. Responsive to doing so, the analytics server can identify one or more UTXOs that correspond with the first distributed ledger-based account and combine the UTXOs into one or more larger UTXOs at the times or instances. The analytics server can append the combined UTXOs onto the blockchain to generate a record of the new UTXOs. In another example, the analytics server can combine UTXOs when determining UTXOs to use to complete the transactions of the timeseries of predicted transactions. For example, the analytics server can determine a sequence of sets of UTXOs (e.g., sets of one or more UTXOs) to use for the transactions, but also determine that using the sequence of UTXOs to complete the transactions will result in the creation of one or more UTXOs with a size below a threshold (e.g., a dust threshold). Responsive to the determination, the analytics server can identify other UTXOs with the UTXOs that would result in the creation of dust and identify times (e.g., times with the lowest or low transaction costs) to combine the UTXOs from the timeseries of predicted transaction costs, such as by identifying the times before the predicted transactions that will result in the dust with the lowest transaction costs. The analytics server can combine the identified UTXOs at the identified times to create larger UTXOs that will not result in creating dust when used in the predicted transactions.

At step 314, the analytics server appends a block instance corresponding to the pending transaction to the blockchain. The analytics server can append the block instance to the blockchain responsive to selecting the one or more UTXOs to use to complete the pending transaction. To do so, the analytics server can generate instructions to append a block instance to the blockchain that includes transaction attributes for the pending transaction and identifications of the one or more UTXOs that the analytics server selected to complete the transaction. The analytics server can transmit the instructions to the nodes maintaining the blockchain. Each of the nodes that maintain the blockchain, in some cases including the analytics server, can generate a block instance that includes the data of the pending transaction including the identifications of the UTXOs and a hash that the analytics server calculates (e.g., MD5, SHA-1, SHA-256, Blake2, etc.) from the data of the block instance and/or the hash of the previously final block instance of the blockchain. Upon each or a number of nodes generating a matching block instance and/or a matching version of the blockchain including the block instance above a threshold, the nodes can append the block instance to the blockchain.

The analytics server and/or the nodes of the blockchain can generate a new UTXO for the first distributed ledger-based account based on the pending transaction. For example, the analytics server and/or the nodes of the blockchain can generate a new UTXO for the first distributed ledger-based account with a size that is equal to a difference, if any, between the selected UTXOs and cryptographic tokens that the analytics server selected to complete the transactions and the value of the pending transaction. The analytics server can append a block instance containing the new UTXO to the blockchain for use in a future transaction by the first distributed ledger-based account. The analytics server and/or the nodes of the blockchain can complete the future transaction and any number of other transactions by repeating the steps of the method 300.

Figure 4:
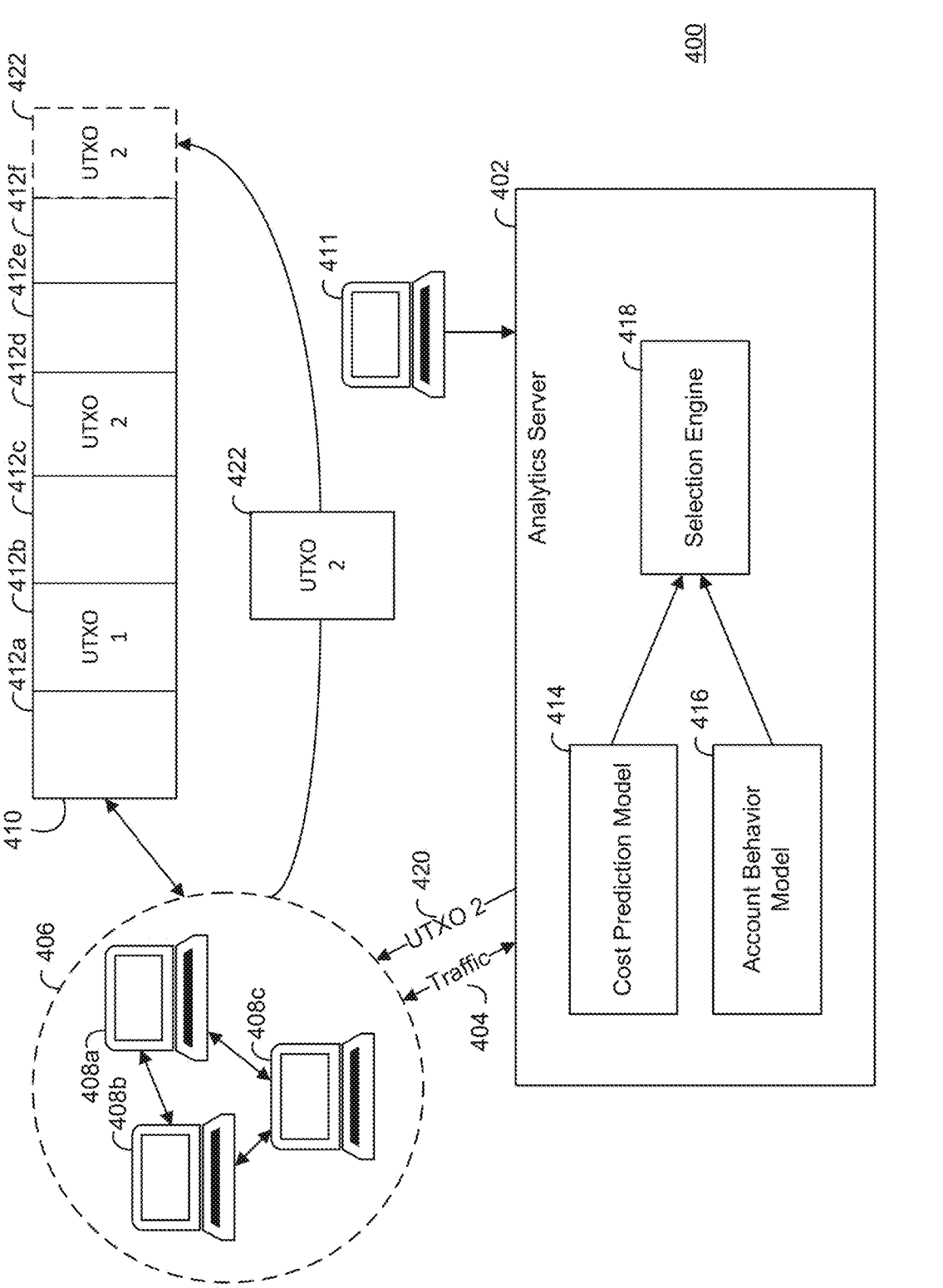
FIG. 4 illustrates a sequence diagram of a sequence for blockchain network traffic management in accordance with an embodiment.

FIG. 4 illustrates a sequence diagram of a sequence 400 for blockchain network traffic management in accordance with an embodiment. The operational steps may be performed by an analytics server (e.g., the analytics server 105a). However, one or more of the operational steps may be executed by any number of computing devices operating in the distributed computing system described in FIG. 1. For instance, one or more computing devices (e.g., user devices) may locally perform part or all of the operational steps described with reference to FIG. 4. Moreover, one or more of the operational steps can be performed via any processor of the system, such as any processor of the system 100.

In the sequence 400, an analytics server 402 can monitor network traffic 404 of a blockchain computing network 406. The blockchain computing network 406 can include nodes 408a-c that are configured to maintain and/or update a blockchain 410 that is configured to store transaction data for transactions performed through the blockchain computing network 406. The analytics server 402 can monitor the network traffic 404 of the blockchain computing network 406, for example, by querying a mempool stored in memory of one of the nodes 408a-c or in memory of the analytics server 402 that contains unconfirmed transactions for the blockchain computing network 406. The analytics server

402 can determine the network traffic and level of network congestion to be the number of unconfirmed transactions that are stored in the mempool.

The blockchain 410 can include block instances 412a-f. The block instances 412a-f can contain data for different transactions that are performed through the blockchain computing network 406 and/or UTXOs that are stored in the blockchain. For example, the block instances 412a, c, e, f can each correspond to a different transaction or set of transactions. The blockchain 410 can also include block instances 412b, d. The block instances 412a, d can each store data for UTXOs for a first distributed ledger-based account associated with the blockchain 410.

The analytics server 402 can receive a transaction request from a computing device 411 for a transaction between the first distributed ledger-based account and a second distributed ledger-based account. Responsive to receiving the transaction request, the analytics server 402 can determine the current network congestion of the blockchain computing network 406. The analytics server 402 can do so by querying the mempool for the blockchain computing network 406 or by querying a database that contains the most recently determined network congestion level for the blockchain computing network 406. The analytics server 402 can execute a cost prediction model 414 using the current network traffic and/or historical transaction data of transactions performed through the blockchain 410 as input to generate a timeseries of predicted transaction costs. The analytics server 402 can also execute an account behavior model 416 using an identification of the first distributed ledger-based account and/or historical transaction data of the first distributed ledger-based account as input to generate a timeseries of predicted transactions for the first distributed ledger-based account. The analytics server 402 can input the output timeseries with any other input parameters (e.g., a time frame to complete the pending transaction, a rate of transactions that the first distributed ledger-based account typically performs, etc.) from the first distributed ledger-based account and the second distributed ledger-based account into a selection engine 418. The selection engine 418 can be or include executable instructions that are configured to apply one or more rules and/or an optimization function to the timeseries and/or parameters to identify one or more UTXOs corresponding to the first distributed ledger-based account to use to complete the pending transaction. The selection engine 418 can apply the rules to select the UTXO 420 responsive to determining using the UTXO 420 to complete the transaction will optimize the amount of network traffic within the blockchain computing network 406.

The analytics server 402 can complete the transaction between the first distributed ledger-based account and the second distributed ledger-based account using the selected UTXO corresponding to the first distributed ledger-based account. For example, the analytics server 402 can append a block instance 422 to the blockchain 410 containing an identification of the selected UTXO 420 responsive to selecting the UTXO 420. The analytics server 402 can append the block instance 422 to the blockchain 410 by transmitting instructions to the blockchain computing network 406 to complete the transaction using the UTXO 420 and any other cryptocurrency that is necessary to have a value that is at least the value of the transaction and/or that will not generate another UTXO with a size below a threshold (e.g., to avoid creating dust with the transaction). The blockchain computing network 406 can receive the instructions and append the block instance 422 containing the identification of the UTXO 420, identifications of the first and/or second distributed ledger-based account of the transaction, and/or any other data relating to the transaction, such as a timestamp of the current time, to the blockchain 410, thus completing the transaction. In doing so, the blockchain computing network 406 can append the block instance 422 to the block instance 412f (e.g., the last or terminal block instance of the blockchain 410), for example.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:

a computing device in communication with a plurality of nodes maintaining a blockchain, wherein the computing device comprises memory having instructions and at least one processor configured to execute the instructions to:

responsive to receiving a transaction request corresponding to a pending transaction between a first distributed ledger-based account and a second distributed ledger-based account, the first distributed ledger-based account corresponding to a plurality of unspent transaction outputs (UTXOs) stored in one or more block instances of the blockchain:

execute a machine learning model based at least on the first distributed ledger-based account to generate a timeseries of one or more predicted transactions for the first distributed ledger-based account;

determine a sequence of sets of UTXOs from the plurality of UTXOs of the first distributed ledger-based account to use to complete the timeseries of one or more predicted transactions such that completion of the timeseries of pending transactions using the sequence of sets of UTXOs will not result in any UTXOs with a size below a threshold, the plurality of UTXOs comprising a set of remaining UTXOs not included in the sequence of sets of UTXOs;

select a UTXO to use to complete the pending transaction from the set of remaining UTXOs of the plurality of UTXOs; and responsive to selecting the UTXO, append a block instance corresponding to the pending transaction to the blockchain, the block instance comprising an identification of the selected UTXO.

2. The system of claim 1, wherein the at least one processor is configured to:

train the machine learning model based on transaction data of historical transactions performed by a plurality of distributed ledger-based accounts, the plurality of distributed ledger-based accounts including the first distributed ledger-based account, wherein the at least one processor is configured to execute the machine learning model based on the first distributed ledger-based account by using an identification of the first distributed ledger-based account as an input for the execution of the machine learning model.

3. The system of claim 1, wherein the at least one processor is configured to:

train the machine learning model based only on transaction data of historical transactions performed by the first distributed ledger-based account, wherein the at least one processor is configured to execute the machine learning model based on the first distributed ledger-based account without inputting an address of the first distributed ledger-based account.

4. The system of claim 1, wherein the at least one processor is configured to execute the machine learning model based on the first distributed ledger-based account by:

executing the machine learning model using transaction data of a defined set of transactions performed by the first distributed ledger-based account.

5. The system of claim 4, wherein the at least one processor is configured to identify the defined set of transactions by identifying a defined number of the most recent transaction performed by the first distributed ledger-based account or identifying a set of transaction performed by the first distributed ledger-based account within a defined time period.

6. The system of claim 1, wherein the one or more predicted transactions comprise a plurality of predicted transactions and the at least one processor is configured to:

determine a set of UTXOs of the plurality of UTXOs for each of the plurality of predicted transactions; and responsive to determining that performing the plurality of predicted transactions will result in one or more UTXO with a size below a threshold, combine the one or more UTXOs with the size below threshold with another UTXO of the set of UTXOs.

7. The system of claim 1, wherein the at least one processor is configured to select the UTXO responsive to determining completion of the pending transaction with the UTXO will not cause the UTXO to have a size below the threshold.

8. The system of claim 1, wherein the at least one processor is further configured to:

determine a current level of network congestion for the blockchain;

execute a second machine learning model based at least on the determined current level of network congestion to generate a timeseries of one or more predicted transaction costs for the blockchain;

select the UTXO to use to complete the pending transaction based on the timeseries of one or more predicted transaction costs for the blockchain.

9. The system of claim 8, wherein the at least one processor is configured to select the UTXO by:

comparing a size of the UTXO with sizes of the plurality of UTXOs;

comparing a current transaction cost with the timeseries of predicted transaction costs; and selecting the UTXO responsive to (i) determining the size of the UTXO exceeds one or more of the sizes of the plurality of UTXOs, and (ii) determining the current transaction cost is higher than one or more transaction costs of the timeseries of predicted transaction costs.

10. The system of claim 8, wherein the at least one processor is configured to select the UTXO by:

selecting a second plurality of UTXOs, including the UTXO, from the plurality of UTXOs responsive to (i) determining each of the second plurality of UTXOs have a size lower than one or more sizes of the plurality of UTXOs, and (ii) determining a current transaction cost is lower than one or more transaction costs of the timeseries of predicted transaction costs, wherein the at least one processor is configured to append the block instance corresponding to the pending transaction to the blockchain to include an identification for each of the second plurality of UTXOs.

11. A method comprising:

responsive to receiving a transaction request corresponding to a pending transaction between a first distributed ledger-based account and a second distributed ledger-based account, the first distributed ledger-based account corresponding to a plurality of unspent transaction outputs (UTXOs) stored in one or more block instances of a blockchain:

executing, by one or more processors, a machine learning model based at least on the first distributed ledger-based account to generate a timeseries of one or more predicted transactions for the first distributed ledger-based account;

determining, by the one or more processors, a sequence of sets of UTXOs from the plurality of UTXOs of the first distributed ledger-based account to use to complete the timeseries of one or more predicted transactions such that completion of the timeseries of pending transactions using the sequence of sets of UTXOs will not result in any UTXOs with a size below a threshold, the plurality of UTXOs comprising a set of remaining UTXOs not included in the sequence of sets of UTXOs;

selecting, by the one or more processors, a UTXO to use to complete the pending transaction from the set of remaining UTXOs of the plurality of UTXOs; and responsive to selecting the UTXO, appending, by the one or more processors, a block instance corresponding to the pending transaction to the blockchain, the block instance comprising an identification of the selected UTXO.

12. The method of claim 11, comprising:

training, by the one or more processors, the machine learning model based on transaction data of historical transactions performed by a plurality of distributed ledger-based accounts, the plurality of distributed ledger-based accounts including the first distributed ledger-based account, wherein executing the machine learning model based on the first distributed ledger-based account comprises executing, by the one or more processors, the machine learning model using an identification of the first distributed ledger-based account as an input for the execution of the machine learning model.

13. The method of claim 11, comprising:

training, by the one or more processors, the machine learning model based only on transaction data of historical transactions performed by the first distributed ledger-based account, wherein executing the machine learning model based on the first distributed ledger-based account comprises executing, by the one or more processors, the machine learning model without inputting an address of the first distributed ledger-based account.

14. The method of claim 11, wherein executing the machine learning model based on the first distributed ledger-based account comprises:

executing, by the one or more processors, the machine learning model using transaction data of a defined set of transactions performed by the first distributed ledger-based account.

15. The method of claim 14, wherein identifying the defined set of transactions comprises identifying, by the one or more processors, a defined number of the most recent transaction performed by the first distributed ledger-based account or identifying a set of transaction performed by the first distributed ledger-based account within a defined time period.

16. The method of claim 11, wherein the one or more predicted transactions comprise a plurality of predicted transactions, and the method comprises:

determining, by the one or more processors, a set of UTXOs of the plurality of UTXOs for each of the plurality of predicted transactions; and responsive to determining that performing the plurality of predicted transactions will result in one or more UTXO with a size below a threshold, combining, by the one or more processors, the one or more UTXOs with the size below threshold with another UTXO of the set of UTXOs.

17. The method of claim 11, wherein selecting the UTXO comprises selecting, by the one or more processors, the UTXO responsive to determining completion of the pending transaction with the UTXO will not cause the UTXO to have a size below the threshold.

18. The method of claim 11, further comprising:

determining, by the one or more processors, a current level of network congestion for the blockchain;

executing, by the one or more processors, a second machine learning model based at least on the determined current level of network congestion to generate a timeseries of one or more predicted transaction costs for the blockchain;

selecting, by the one or more processors, the UTXO to use to complete the pending transaction based further on the timeseries of one or more predicted transaction costs for the blockchain.

19. The method of claim 18, comprising:

comparing, by the one or more processors, a size of the UTXO with sizes of the plurality of UTXOs;

comparing, by the one or more processors, a current transaction cost with the timeseries of predicted transaction costs; and selecting, by the one or more processors, the UTXO responsive to (i) determining the size of the UTXO exceeds one or more of the sizes of the plurality of UTXOs, and (ii) determining the current transaction cost is higher than one or more transaction costs of the timeseries of predicted transaction costs.

20. The method of claim 18, wherein selecting the UTXO comprises:

selecting, by the one or more processors, a second plurality of UTXOs, including the UTXO, from the plurality of UTXOs responsive to (i) determining each of the second plurality of UTXOs have a size lower than one or more sizes of the plurality of UTXOs, and (ii) determining a current transaction cost is lower than one or more transaction costs of the timeseries of predicted transaction costs, wherein appending the block instance corresponding to the pending transaction to the blockchain comprises appending, by the one or more processors, the block instance corresponding to the pending transaction to the blockchain to include an identification for each of the second plurality of UTXOs.

* * * * *